United States Patent [19]

Burgheimer

[11] 3,944,454
[45] Mar. 16, 1976

[54] HEAT-BONDING METHOD

[75] Inventor: Joanne Burgheimer, White Plains, N.Y.

[73] Assignee: The Dimension Weld International Corporation, Stamford, Conn.

[22] Filed: June 25, 1974

[21] Appl. No.: 483,066

[52] U.S. Cl. .............................. 156/273; 156/309
[51] Int. Cl.² ... B32B 31/06; C09J 7/00; H05B 9/04
[58] Field of Search .......... 156/273, 272, 251, 306, 156/309; 219/10.81, 10.53, 10.41; 264/27

[56] References Cited
UNITED STATES PATENTS

| | | | |
|---|---|---|---|
| 2,463,054 | 3/1949 | Quayle et al. | 156/273 |
| 3,017,484 | 1/1962 | England et al. | 219/10.53 |
| 3,232,810 | 2/1966 | Reesen | 156/273 |
| 3,531,365 | 9/1970 | Melin | 156/273 |
| 3,647,607 | 3/1972 | Hillers | 156/272 |
| 3,758,358 | 9/1973 | Kuroda | 156/251 |
| 3,823,052 | 7/1974 | Hargett | 156/273 |

*Primary Examiner*—Douglas J. Drummond
*Assistant Examiner*—M. G. Wityshyn
*Attorney, Agent, or Firm*—Michael S. Striker

[57] ABSTRACT

Thermoplastic materials, such as polyvinylchoride, cannot normally be heat bonded to certain higher-melting synthetic fabrics, such as nylon or the like, which are of the densely woven type and are also frequently treated with silicone or analogous substances to make them water repellant and/or windproof. The present method overcomes this problem by heat-bonding such materials under pressure and the application of a dielectric field, and by causing sufficient dielectric resistance to be present at the synthetic fabric so that the dielectric field is able to heat the synthetic fabric to a temperature at which it becomes sufficiently flowable to bond with the thermoplastic material.

12 Claims, 4 Drawing Figures

HEAT-BONDING METHOD

BACKGROUND OF THE INVENTION

The present invention relates to a heat-bonding method. In particular, it relates to a method of heat-bonding thermoplastic materials to types of synthetic fabrics to which such materials could not heretofore be successfully bonded.

It is well established in the art that thermoplastic materials, such as polyvinylchloride, polyethylene and the like, can be heat bonded to one another and to a variety of substrates of various materials. The most commonly used method for effecting such a bond is Radio Frequency Bonding, where a dielectric field is impressed across an assembly of the materials to be bonded together. One of the electrodes carries a die having a raised design, and when the assembly is compressed between the electrodes the materials become welded or bonded together along the design lines of the die. Such a method is disclosed in U.S. Pat. No. 2,946,713 of P. Dusina, Jr. et al.

It is equally well known in the art, however, that all heat-bonding methods heretofore known are quite ineffective for producing a reasonably permanent bond between thermoplastic materials and certain types of synthetic fabrics. These fabrics are of a type having a dense weave, usually known as "plainweave". Such fabrics, usually—but not always taffeta—may be of nylon, polyester, rayon acetate or similar materials, and their weave is especially dense if the fabrics are woven of filament yarn.

Synthetic fabrics of this type are widely used in a variety of applications. They may be converted into articles of apparel, such as "windbreakers", lightweight sports jackets, sailing apparel, ski and racing apparel. Again, they are used in manufacturing children's wear, camping equipment such as lightweight tents, sails for boats, and many other items. It is in the nature of many of these applications that the fabric (or the item made of it) should be windproof and/or water repellent; for this reason, many of these fabrics are coated or impregnated with silicones or fluorocarbons in order to attain these desired characteristics.

It is very desirable to be able to heat bond thermoplastic materials to such fabrics, for example, in form of decorative appliques. Experience has, however, always shown heretofore that a reliable bond could not be obtained between these materials. While a slight bonding action was usually observed when prior-art methods were used, the lightest pull was sufficient to separate the applique from the base fabric. It is evident from the nature of the articles which are listed above by way of example, that many—if not most of them—would have increased appeal if they could be provided with a decorative applique, for instance with a club badge on a ski jacket. Indeed, such articles are widely provided with appliques; however, in all instances these are appliques which are separately manufactured and which are then stitched onto the article. The use of heat-bonded thermoplastic appliques, which inherently would permit the application of a wider range of designs that could be applied at lower cost, has heretofore always been impossible.

SUMMARY OF THE INVENTION

It is an object of the present invention to overcome the aforementioned problems.

More particularly, it is an object of the invention to provide a novel method of heat-bonding thermoplastic materials to the types of fabric mentioned above, to which such heat-bonding was heretofore impossible.

The present invention is based on the realization that there are several factors which have heretofore prevented the heat-bonding of the materials in question.

In many other applications the successful heat-bonding of thermoplastic materials to a base fabric is due to the fact that, when the thermoplastic material becomes flowable under the influence of heat, some of the material can flow into interstices of the base fabric and adhere to the latter when the thermplastic material subsequently resolidifies. In the type of synthetic fabrics with which the present invention is concerned, this is not possible because the weave is so dense that the thermoplastic material cannot penetrate into it.

In addition, if silicone or fluorocarbon has been applied to the synthetic fabric for the reasons outlined earlier, it will further prevent any possible penetration of the thermoplastic material. Moreover, silicone or fluorocarbon will actually act as a "release agent" and negate what little adhesion there might otherwise take place (without penetration) between the thermoplastic material and the surface of the synthetic fabric.

Also, the thermo-physical, chemical and dielectric properties of the synthetic fabrics in question are not readily compatible with those of the thermoplastic materials that are used for thermally bonded appliques. For example, polyvinylchloride is widely used as the thermoplastic material for such applications, and nylon or polyester are widely used as synthetic fabrics of the type under discussion. The heat-bonding range of nylon or polyester fibers is in the 325°–450° F range, whereas that of polyvinylchloride sheeting is approximately in the 26°–300° F range. It is easy to see that these materials cannot be heat-bonded unless they are both brought to a state of liquidity, where it should theoretically be possible to cause them to flow together and subsequently bond to one another. Experiments with dielectric bonding have shown that short of these conditions, and even when exerting extreme electrode pressures upon the materials, it is practically impossible to obtain such flowing-together and bonding. When both materials are made flowable, on the other hand, there is the likelihood that the lower-melting thermoplastic material will decompose by the time the melting point of the higher-melting material is reached.

The present invention overcomes these problems and for the first time permits heat-bonding of the types of materials which are under discussion herein.

The invention resides in a method of heat-bonding a layer of thermoplastic material to a densely woven synthetic fabric which has a higher melting point that the thermoplastic material and is impenetrable to the latter even when the thermoplastic material is in flowable state. The novel invention comprises the steps of juxtaposing the layer of thermoplastic material and the synthetic fabric in overlying relationship, so as to form an assembly. Thereupon, the assembly is subjected to pressure in bonding zones in which the layer is to be bonded to the fabric and sufficient heat is applied in these zones to the assembly to render the thermoplastic material flowable.

In accordance with the present invention this heating of the thermoplastic material is accompanied by heating of the synthetic fabric to such an extent as to render the synthetic plastic fabric sufficiently flowable in the bonding zones to enter into a bond with the thermoplastic material.

The invention is especially suitable for use with dielectric bonding techniques. Technically, the thermoplastic material of the applique to be affixed—which as a rule must be thicker than the synthetic base fabric—offers greater resistance to the dielectric field than does the thinner base fabric. Since the amount of heat created in a material subjected to a dielectric field is in proportion to the resistance offered by the material to the field, it follows that when the thermoplastic material is sufficiently softened to "flow" under pressure, the synthetic base fabric will still be "hard" (i.e., non-flowing) and continue to be impenetrable. Without the present invention this would result in softening of the thermoplastic material which, failing to penetrate into the base fabric, would resolidify on the base fabric surface and could subsequently be peeled off very easily.

However, the present invention overcomes this by, in effect, endowing the vicinity of the base fabric with a dielectric resistance which is substantial enough to cause heating of the base fabric to a level at which it will soften and become able to bond with the thermoplastic material. For this purpose, the present invention provides adjacent the base fabric—at a side of the same which faces away from the thermoplastic material—a material having a dielectric resistance that is greater than the dielectric resistance of the base fabric and which will, when a dielectric field is impressed across the assembly, result in the generation of sufficient heat to cause the desired softening of the base fabric.

In other words: while the thermoplastic material is subjected to dielectric heating sufficient to cause it to reach flowable state, the base fabric is also subjected to heating which is adequate to cause it to soften or flow, but this latter heating cannot cause the thermoplastic material to decompose.

The novel features which are considered as characteristic for the invention are set forth in particular in the appended claims. The invention itself, however, both as to its construction and its method operation, together with additional objects and advantages thereof, will be best understood from the following description of specific embodiments when read in connection with the accompanying drawing.

DESCRIPTION OF THE PREFERRED EMBODIMENTS

Figure 1:
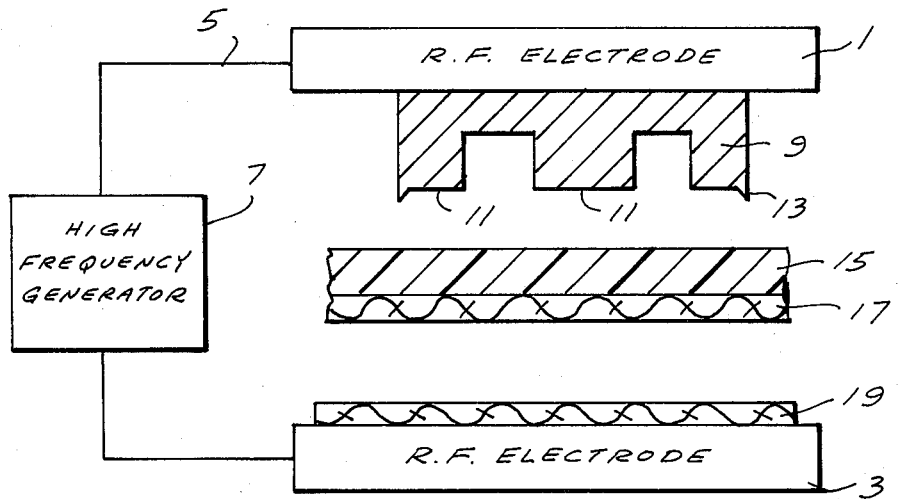
FIG. 1 is a somewhat diagrammatic cross section showing an apparatus being used in carrying out the present method.

Referring now in detail to the drawing, and firstly to FIG. 1, it will be understood that this Figure illustrates diagrammatically an apparatus for high-frequency heat welding or bonding, which can be employed in carrying out the method according to the present invention. Reference numerals 1 and 3 identify two RF (radio frequency) electrodes which can be moved towards and away from one another and which are connected by the diagrammatically illustrated circuit 5 to a high-frequency generator 7. One of the electrodes, in FIG. 1 the upper electrode 1, carries a die 9 which is provided with design lines that are to be formed in an applique; the design lines, along which heat bonding is to occur, are constituted by the raised pressure-exerting lands 11. The outer contour line of the applique to be formed is delimited by a usually circumferentially complete cutting edge 13 which can cut through at least the thermoplastic material that is to form the applique. Of course, the edge 13 could also be blunt, in which case it would form a tear seal along which those portions of the thermoplastic material which surround the applique could be torn off after formation of the applique. To obtain some "pre-softening" of the sheet 15 and speed up the subsequent RF bonding, the electrode 1 may additionally be induction heated to about 175°–200° F.

Located between the electrode 3 and the die 9 is an assembly composed of a layer of thermoplastic sheet material 15, e.g., polyvinylchloride, and a synthetic fabric 17, e.g., nylon taffeta. The assembly is shown unsupported for clarity; actually, it would usually be placed upon the electrode 3 or, if the orientation were reversed, on the electrode 1.

If the electrodes were to be brought together in the condition thus far described, so that the die 9 would exert pressure upon the assembly and heat created by the resistance of the components 15, 17 to the dielectric field would develop, the material of sheet material 15 would temporarily soften on the surface of fabric 17 and, upon resolidification, the material 15 would at first sight seem to form an applique on the fabric 17. However, even a slight pull would completely separate the sheet material 15 and the fabric 17, since no bond would have occurred.

Such a bond will, however, result during operation of the apparatus if, prior to the bringing-together of the electrodes 1, 3 and impressing of the dielectric field across the assembly 15, 17, a layer 19 of what I choose to call a "catalyst material" is placed between the fabric 17 and the electrode 3. When this layer 19 is in place, and the apparatus is operated in the usual manner for dielectric welding, the dielectric resistance created in the layer 19 will be sufficiently high to cause heating of the adjacent fabric 17 to the point where the fabric 17 softens and becomes flowable.

As such softening occurs, the interstices in the weave of the material 17 widen and the support which was previously afforded a silicone or fluorocarbon coating or impregnating medium (if one was present) by the fabric 17 disappears. Since at the same time the sheet material 15 has also softened and becomes flowable, the material of the sheet 15 will now be able to penetrate the fabric 17 and become firmly bonded to the same, as by becoming anchored in the interstices of the weave. The previous possibility of peeling the sheet 15 of the finished applique off the fabric 17 has disappeared, and a firm and lasting bond been established.

My experiments have shown that various catalyst materials are suitable for the layer 19. The one which I currently prefer because of its effectiveness is acrylic material which may be used in form of a smooth or napped woven or knitted fabric, or in form of a rigid or semi-rigid sheet. I have observed that if I use it in form of a fabric, the fibers at the fabric surface tend to bond to the portions of the sheet 15 which flow into and sometimes through the fabric 17. When the finished article is subsequently separated from the layer 19, these fibers will tear loose from the layer 19, since they are firmly adhered to the finished article where they will actually improve the bond between the sheet 15 and the fabric 17. Since they are located at the blind side of the fabric 17, which is usually concealed from view, the presence of these fibers is in most cases not objectionable. Otherwise, an acrylic sheet could be used. In place of acrylic material I can, however, also use other materials as long as they have the desired dielectric characteristics; for example "melamine", phenolic materials, "nylon 6", or the like. Of course, in addition to having the requisite dielectric characteristics, these materials should have a high enough melting point to remain solid while the material sheet 15 softens and becomes flowable.

As previously pointed out, certain of the thermoplastic materials used for the sheet 15 in making heat-bonded appliques, among them polyvinylchloride, do not easily bond to certain of the fabrics 17, such as nylon, both from a physical and a chemical point of view. It is therefore desirable to further improve the bond which is obtained in accordance with the method that I have described with reference to FIG. 1.

Figure 2:
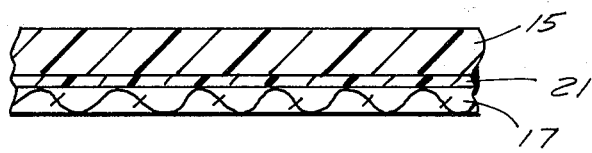
FIG. 2 is a fragmentary cross section of an assembly embodying a further concept of the invention.

This is done by placing, as shown in FIG. 2, a layer 21 of a thermally activatable adhesive between the sheet 15 and the fabric 17, before the application of pressure and RF frequency takes place. This adhesive can be applied in any desired form; however, adhesives of this type are available in sheet form which I currently prefer because this is the most convenient way of handling the adhesive.

When pressure and heat are subsequently applied, in the manner discussed with reference to FIG. 1, the adhesive layer 21 liquefies and flows into an excellent marriage with the material of the fabric 17, together with the softened material of the sheet 15. The finished bond is very durable and commercially completely acceptable; it is as good as or better than the bond which is obtained when such appliques are heat bonded to other base fabrics where the problems overcome by the present invention inherently do not exist.

Various adhesives or bonding agents are suitable for the layer 21. I have found a polyester-based adhesive especially effective which is available under the tradename "Estobond" from the Eastman Chemical Co. However, any other heat-activatable polyester- or acrylic-based bonding agent is also suitable, as are certain EAA (ethylene acrylic acid), EVA (ethylene vinyl acetate) and modified PVA (polyvinyl acetate) bonding agents. Among the latter three categories some slight amount of experimentation may be required to determine the most efficacious type, but nothing that would be of an undue nature or go beyond the capabilities of those ordinarily conversant with the art.

Figure 3:
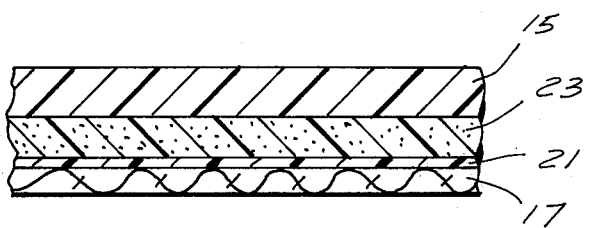
FIG. 3 is a view similar to FIG. 2 but showing still another concept of the invention.

FIG. 3 is reminiscent of FIG. 2, but illustrates that it is also possible to make the finished applique three-dimensional and resiliently padded by including in the assembly—usually between the layer 21 and the sheet 15, if the layer 21 is present, or else between the sheet 15 and the fabric 17—a layer 23 of resiliently compressible spacing material, such as thermoplastic foam material or wadding; the latter may be a fibrous sliver on modacrylic bases, e.g. Dynel. In this case, the lands 11 (FIG. 1) will depress the layer 23, and the heat applied will cause it to collapse and melt in the region beneath the lands 11, so that along the bonding zones which are defined by the elongation of the lands the sheet 15 will be formed with permanent depressions whereas intermediate these bonding zones it will be raised and padded.

Figure 4:
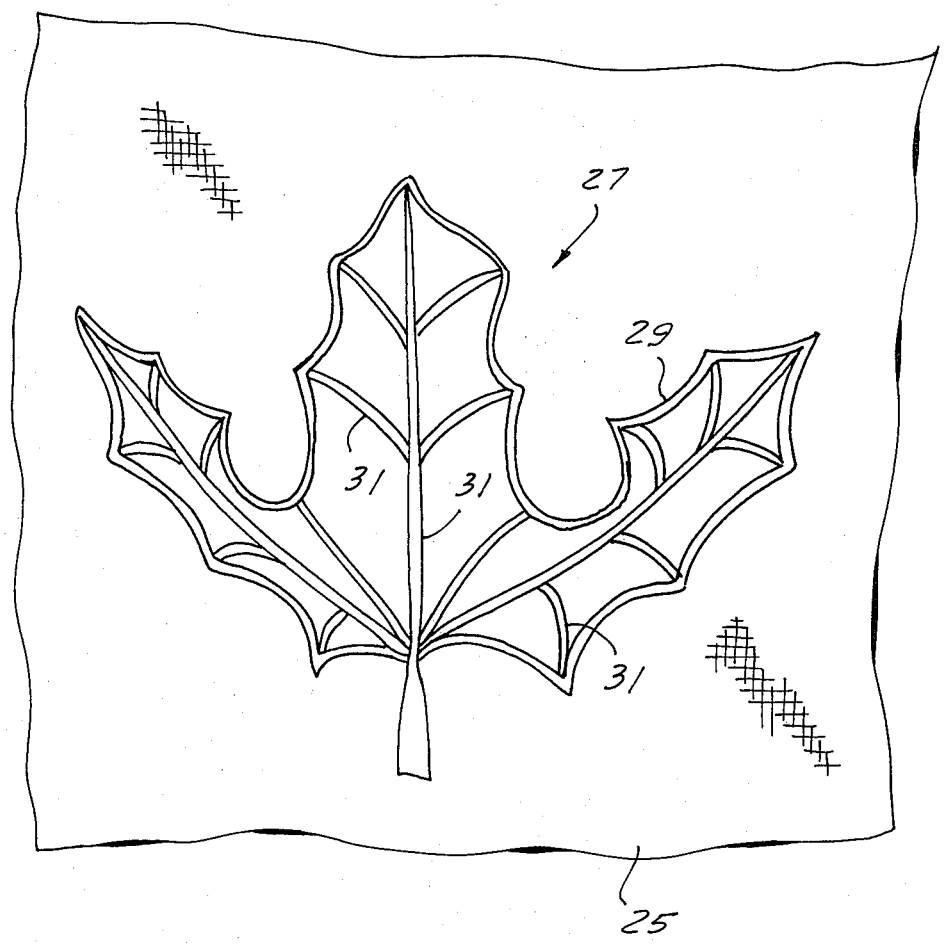
FIG. 4 is a fragmentary plan view, showing a detail of a fabric to which an applique has been heat bonded by the method of the present invention.

In FIG. 4, finally, I have illustrated a completed applique 27 (in form of a leaf) that has been affixed by the present method to a fabric 25 of the type herein discussed, i.e., of the type to which such thermal bonding was previously impossible. Reference numeral 29 identifies the outer contour outline of the applique 27, along which any excess material of the sheet 15 is torn away or cut off by the cutting edge 13. Reference numeral 31 identifies the inner bonding zones or lines, along which the sheet 15 (see FIGS. 1–3) is bonded to the fabric 25, in addition to the bonding which has occurred along the zone 29. If the layer 23 of FIG. 3 is present, then the sheet 15 will be depressed in these zones 29 and 31, but will be raised and resiliently padded everywhere else.

It is not believed to be necessary to discuss the adjustment of a dielectric welding apparatus in order to carry out the present invention. The practitioners conversant with the field of RF welding will appreciate that some slight experimentation will be required in order to determine the exact duration and strength of the dielectric field. However, this is fully within the abilities of those who are active in this field and is done as a matter of routine whenever any new RF welding job is undertaken.

It will be understood that each of the elements described above, or two or more together, may also find a useful application in other types of constructions differing from the type described above.

While the invention has been illustrated and described as embodied in the welding of thermoplastic appliques to densely woven synthetic fabrics, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of heat-bonding a layer of thermoplastic material onto a densely woven synthetic fabric which has a higher melting point than said thermoplastic material and is impenetrable to the latter even when said thermoplastic material is in flowable state, comprising the steps of forming an assembly from a layer of thermoplastic material and a juxtaposed densely woven synthetic fabric having a surface facing the thermoplastic material and another surface facing away therefrom, said fabric also having a higher melting point than said thermoplastic material and interstices which are impenetrable to said thermoplastic material even when the latter is in flowable state; subjecting said assembly to pressure in bonding zones in which said layer is to be bonded to said fabric; subjecting said assembly to a dielectric field so as to apply in said zones sufficient heat to said assembly to render said thermoplastic material flowable; and establishing adjacent said other surface of said synthetic fabric a dielectric resistance greater than the dielectric resistance of said synthetic fabric so as to cause heating of said synthetic fabric to an extent adequate to render the same sufficiently flowable in said zones to bond with said thermoplastic material.

2. A method as defined in claim 1, wherein the step of subjecting comprises pressing said assembly between an electrode and a counter electrode so that said layer is engaged by the latter, and further comprising the step of preheating said counter electrode to a temperature lower than that of said heat which renders said thermoplastic material flowable.

3. A method as defined in claim 1, wherein the step of establishing said dielectric resistance comprises placing adjacent said synthetic fabric a material having a dielectric resistance greater than the dielectric resistance of said fabric.

4. A method as defined in claim 1, wherein the step of subjecting comprises pressing said assembly between an electrode and a counter electrode so that said synthetic fabric is adjacent to the former; and wherein the step of establishing comprises interposing between said electrode and said synthetic fabric a material having a dielectric resistance greater than the dielectric resistance to said synthetic fabric.

5. A method as defined in claim 1, wherein the step of subjecting comprises pressing said assembly between an electrode and a counter electrode so that said synthetic fabric is adjacent to the former; and wherein the step of establishing comprises interposing between said electrode and said synthetic fabric an acrylic fabric having a dielectric resistance greater than the dielectric resistance of said synthetic fabric.

6. A method as defined in claim 1, wherein the step of subjecting comprises pressing said assembly between an electrode and a counter electrode so that said synthetic fabric is adjacent to the former; and wherein the step of establishing comprises interposing between said electrode and said synthetic fabric an acrylic sheet material having a dielectric resistance greater than the dielectric resistance of said synthetic fabric.

7. A method as defined in claim 1, wherein the step of subjecting comprises pressing said assembly between an electrode and a counter electrode so that said synthetic fabric is adjacent to the former; and wherein the step of establishing comprises interposing between said electrode and said synthetic fabric a phenolic sheet material having a dielectric resistance greater than the dielectric resistance of said synthetic fabric.

8. A method as defined in claim 1, wherein the step of subjecting comprises pressing said assembly between an electrode and a counter electrode so that said synthetic fabric is adjacent to the former; and wherein the step of establishing comprises interposing between said electrode and said synthetic fabric a melamine sheet material having a dielectric resistance greater than the dielectric resistance of said synthetic fabric.

9. A method as defined in claim 4; and further comprising the step of interposing a thermally activatable adhesive between said layer and said synthetic fabric prior to the step of subjecting said assembly to pressure.

10. A method as defined in claim 4; and further comprising the step of interposing a sheet of thermally activatable adhesive between said layer and said synthetic fabric prior to the step of subjecting said assembly to pressure.

11. A method as defined in claim 9; and further comprising the step of interposing a layer of resiliently compressible material between said adhesive and said layer of thermoplastic material.

12. A method as defined in claim 4; and further comprising the step of interposing a layer of resiliently compressible material between said layer of thermoplastic material and said synthetic fabric.

* * * * *